M. W. HARD.
TERRESTRIAL GLOBE.
APPLICATION FILED DEC. 5, 1914.

1,157,219.

Patented Oct. 19, 1915.
2 SHEETS—SHEET 2.

Witnesses

Inventor
Merrill W. Hard,

By

Attorneys

UNITED STATES PATENT OFFICE.

MERRILL W. HARD, OF DAYTON, OHIO, ASSIGNOR TO WILLIAM F. ECKART, OF CLEVELAND, OHIO.

TERRESTRIAL GLOBE.

1,157,219.  Specification of Letters Patent.  Patented Oct. 19, 1915.

Application filed December 5, 1914. Serial No. 875,582.

*To all whom it may concern:*

Be it known that I, MERRILL W. HARD, a citizen of the United States, residing at Dayton, in the county of Montgomery and State of Ohio, have invented certain new and useful Improvements in Terrestrial Globes, of which the following is a specification, reference being had therein to the accompanying drawing.

This invention relates to terrestrial globes.

The object of the invention is to so mount a globe that it may be caused to accurately describe the movements of the earth and will maintain its axis at the correct inclination during all parts of such movements; and further, to provide such a globe with scales and indicators of such a character and so arranged that various phenomena may be clearly demonstrated, and that various computations may be made, such as the duration of daylight and darkness at a given place on a given day; the time of day on the various parts of the earth's surface; etc.

It is also an object of the invention to provide a globe of this character which will be so simple in construction and operation that it can be operated and understood by a person unskilled both in mechanics and in astronomy; that there will be no parts which will be easily disarranged or broken; and that it can be produced at a cost sufficiently low to enable it to be placed in the ordinary small school and library.

Figure 1:
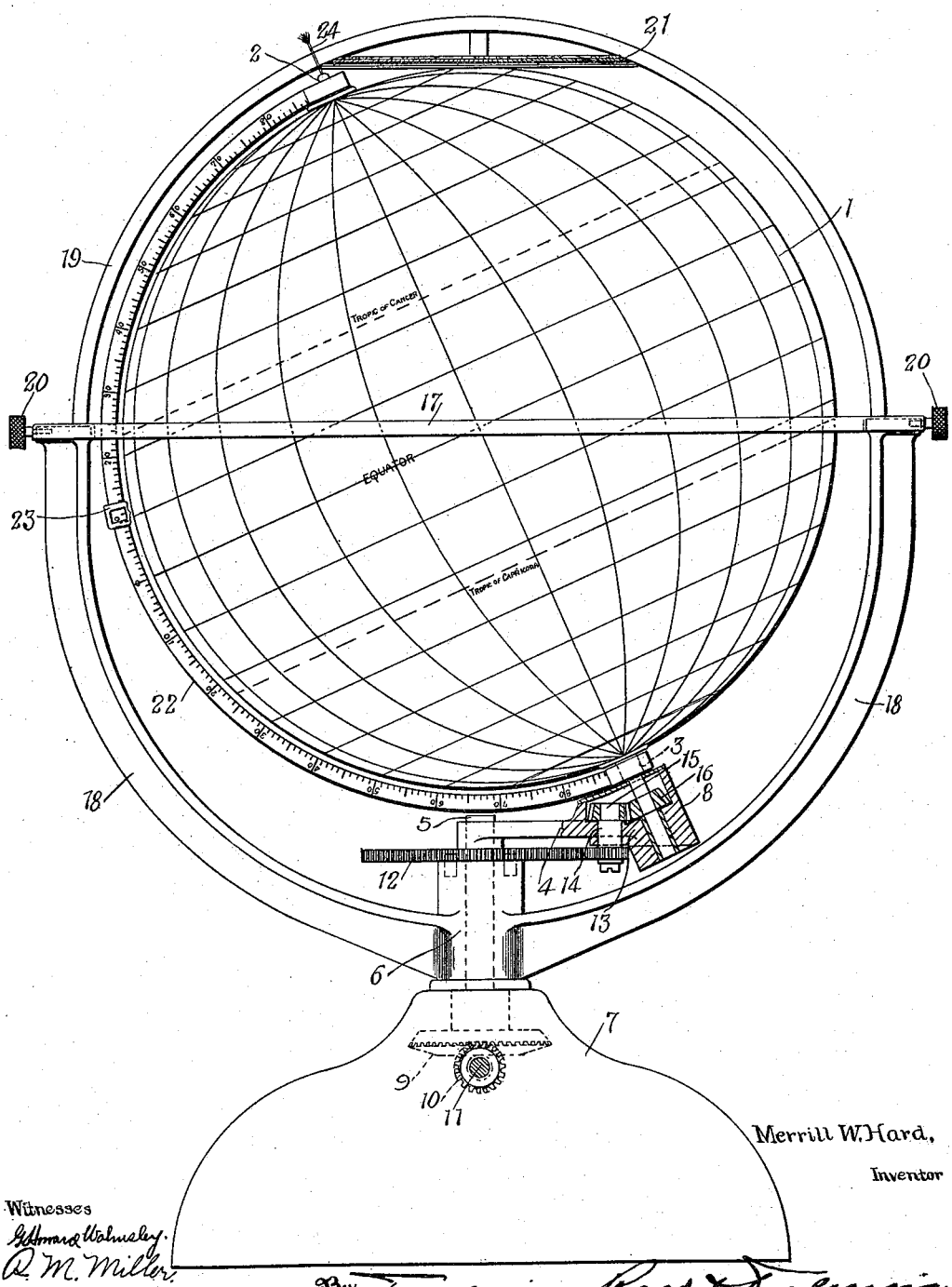
Figure 2:
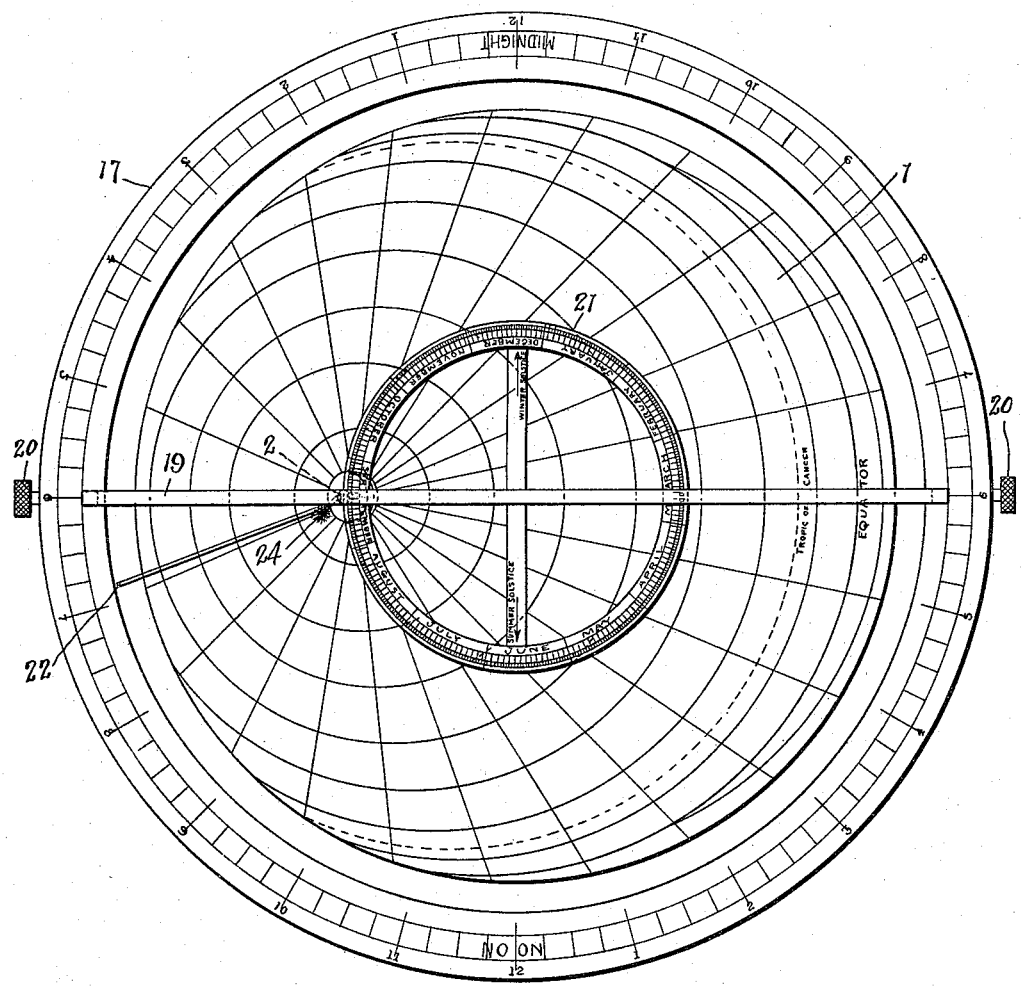

In the accompanying drawings Figure 1 is a side elevation of a terrestrial globe embodying my invention; and Fig. 2 is a top plan view of the same.

In these drawings I have illustrated one embodiment of my invention and have shown a globe 1 mounted for movement about an axis which is arranged at an inclination of $23\frac{1}{2}°$ to the vertical axis extending centrally through the globe. In the present instance the globe is mounted on a shaft arranged at the desired inclination and projecting at its ends beyond the surface of the globe, as shown at 2 and 3, these ends constituting the poles of the axis about which the globe, or earth, rotates. Further, I have so mounted the globe that it will rotate about a vertical axis, thus causing it to have the same motion that the earth has in its movement about the sun, and causing the various phenomena produced by the rotation of the earth about its axis and its revolution about the sun to be produced by this globe. The movements are exactly the same except that the globe does not swing about an orbit but rotates about a fixed vertical axis. The simultaneous movement of the globe about these two axes permits the globe to assume the exact positions that the earth assumes in its movements, and thus enables the various phenomena to be clearly demonstrated and various computations to be made, as will hereinafter appear. To secure the rotary movement of the globe about a vertical axis, I have provided a supporting member which is mounted to rotate about a fixed vertical axis, this axis, in the present instance, being coincident with the vertical axis extending centrally through the globe. The supporting member is here shown in the form of an arm 4 mounted on a shaft 5 which is journaled in a bearing 6 carried by a base 7. The supporting member, or arm, 4 is provided at a point remote from its axis with an inclined bearing 8 to receive the end of the shaft upon which the globe is mounted, which end projects beyond the lower pole of the globe to enable it to be mounted in the bearing. Movement may be simultaneously imparted to the shaft and to the arm 4 to cause the globe to move simultaneously about the two axes, in any suitable manner. In the present instance, the lower end of the shaft 5 is provided with a beveled gear 9 meshed with a similar gear 10 upon an operating shaft 11, said gears being preferably arranged within the base 7 and the shaft projecting beyond the base, where it may be provided with a suitable actuating member, such as a handle or a crank, which actuating member has not been here shown. The rotation of the shaft 5 causes the movement of the globe about its vertical axis and causes it to simultaneously rotate about its inclined axis. I have provided a fixed annular rack or gear 12 arranged concentrically of said vertical axis, and, in the present instance, rigidly secured to the upper end of the bearing 6. Meshing with this gear is a pinion 13 secured to the lower end of a short shaft 14 journaled in the supporting member or arm 4, at a point remote from its axis, and having secured thereto at its upper end a beveled pinion 15 which meshes with a similar pinion 16 secured to the end of the inclined shaft. Thus, as the globe rotates about its vertical axis it is also caused to rotate about its inclined axis. The ratio of the gearing may, if desired, be such as to cause the number of rotations about the two axes to correspond, relatively, to the rotations of the earth, but for demonstrating purposes this is undesirable, because of the length of time it would take to move the globe from one position to another. Therefore, the gear in the present instance is such that the globe makes a comparatively few rotations about its inclined axis for each rotation about its vertical axis.

Arranged circumferentially of the globe in the plane of its greatest horizontal diameter is a band or ring 17 which is divided into sections and provided with marks to indicate the twenty-four hours of the day and fractions thereof. This band is used in determining time and may be designated as the local or daily time band. The time band is numbered from twelve o'clock noon to twelve o'clock midnight and from twelve o'clock midnight to twelve o'clock noon, the numbers running from left to right, and thus permitting the telling of comparative time, as will hereinafter be explained. The time band may also be provided with marks or indications to designate the sidereal time, and, if desired, with the signs of the zodiac. But as these markings and signs are not necessary to an understanding of the present invention, they have been omitted from the present drawings. This time band may be supported in various ways, but as here shown it is carried by two arms 18 extending upwardly from the base, and, in the present instance, secured to the bearing 6. These arms are arranged to engage the time band at points midway between the noon and midnight marks thereon, and together with a semi-circular band 19, which extends over the upper part of the globe and connects the ends of the arms 18, they form a dividing line between the night and day periods of the time band, and may be designated as the darkness and daylight band. As here shown, the time band is secured to the arms 18 by set screws 20, and the upper portion 19 of the darkness and daylight band is permanently secured to the time band. Thus, by loosening the set screws the two bands may be removed and the globe removed from its supporting bearing, should this be desired.

Supported above the globe and arranged to define the circle constituting the path of the end of the inclined axis, or the pole, about which the globe rotates, is a band 21 which is divided according to the divisions of the year, and, in the present instance, is divided into days and months, and may be designated as a date band. This band, which, of course, is concentric to the vertical axis of the globe, or the fixed pole of the earth, is here shown as supported by the upper portion 19 of the daylight and darkness band which intersects said vertical axis. This band is also marked to indicate the summer solstice and the winter solstice. As the globe rotates about its vertical axis, the end of the inclined axis, which corresponds to the true pole of the earth, travels about this $23\frac{1}{2}°$ circle and when this true pole is set to any day of the year, as indicated on the date band, the position of the globe and the inclination of its axis will correspond exactly with the position of the earth and the inclination of the earth's axis on that particular day of the year.

Extending from one end of the inclined axis to the other end thereof is a semi-circular band 22 which is marked to correspond with the degrees of latitude and which may be designated as the degree scale. This band is so connected with the inclined shaft on which the globe is mounted that it will move with the globe when the latter is rotated, but it may also be moved relatively to the globe in order to adjust it from position to position. Preferably this is accomplished by forming a frictional connection between the bearings at the ends of the degree scale and the ends of the shaft. Adjustably mounted on this degree scale and movable lengthwise thereof is an indicator 23, and by moving the degree scale about its axis and adjusting the indicator lengthwise thereof the point of the indicator may be brought into juxtaposition to any selected point on the earth's surface, excepting very limited areas at the two poles. If desired, a flexible indicator 24, such as a small feather, may be secured to the end of the inclined shaft so that it will travel about the date band and project above the same, thereby enabling persons on one side of the globe to determine with reasonable accuracy the position of the pole when the axis is inclined toward the opposite side of the globe. The only necessary characteristic of this indicator is that it shall be of such a character that it can pass beneath the darkness and daylight band.

The mechanism which has been described is very simple but is exceedingly comprehensive, and by its use many of the phenomena due to the earth's movements may be demonstrated with great clearness and many computations may be made. It is not necessary nor desirable to attempt to explain the demonstration of any considerable number of these phenomena nor the making of many computations, but to illustrate the use to which the device may be put, examples will be given of both. One of the interesting phenomena due to the earth's position and movements, and one it is not easy for the child student to understand, is the long nights and days of those regions within the Arctic and Antarctic Circles. This point, however, may be very clearly demonstrated by the use of this globe. To so demonstrate it it is only necessary to set the pole at the summer solstice, or near the same, and move the indicator 23 to any point within the Arctic Circle. Then rotate the globe about its inclined axis and it will be apparent at once that the indicator never passes the highest point of the earth's surface, and consequently, never passes beyond the daylight and darkness band or the line of division between day and night. To illustrate the reverse of this proposition the globe is moved about its vertical axis to bring the pole to a point adjacent the winter solstice, with the indicator in the same position it occupied before, that is, within the Arctic Circle, the globe may make a complete rotation about its inclined axis without the indicator passing the daylight and darkness band. Thus, the student is enabled to picture in his mind clearly the positions and movements of the earth which produce the long day and the long night of the Arctic region, and to understand the reason for the midnight sun of that region.

If it is desired to determine the time of sunrise and sunset at any particular place on any particular day, the globe is rotated to adjust the pole to the particular day in question, as indicated on the date band. The degree scale and its indicator are adjusted to bring the latter into juxtaposition to the particular locality in question and the degree scale is then swung, either with or without the globe, to the left of the "noon" mark on the time band to cause it to intersect with the daylight and darkness band. When the indicator lies beneath the daylight and darkness band, the point of intersection of the degree scale with the time band will indicate the time of sunrise. By then moving the band in the opposite direction, that is, to the right of the "noon" mark, until it again intersects the daylight and darkness band and the indicator lies beneath this band, the point of intersection of the degree scale with the time band will indicate the time that the sun will set. Obviously, the duration of day and night can be quickly computed by taking the difference between sunrise and sunset or sunset and sunrise. Again, it is very easy to determine the exact time of day upon any point of the earth's surface. To do this, the pole is adjusted to the present day of the month, the degree scale is adjusted to intersect the locality of the party desiring the information and then the globe, with the degree scale in its adjusted position, is moved until the degree scale intersects the time band at the mark corresponding to the present time of day. With the globe remaining in this adjusted position the degree scale is moved to cause it to intersect the locality the time of which it is desired to determine. Then the point of intersection of the degree scale with the time band will indicate the time at this distant point.

With these illustrations, the manner of use of the globe and its coöperating scales and indicators will be readily understood. I wish it to be understood, however, that while I have shown and described one embodiment of my invention, this has been chosen for the purpose of illustration and I do not wish to be limited to the details of construction shown and described, for obvious modifications will occur to a person skilled in the art.

Having thus fully described my invention, what I claim is new and desire to cover by Letters Patent, is:

1. The combination with a globe mounted for rotation about both a vertical axis and an inclined axis, of a band supported adjacent to said globe, arranged to define the path of the end of the inclined axis of said globe, and provided with a scale.

2. The combination with a globe mounted for rotation about both a vertical axis and an inclined axis, of a band supported adjacent to said globe, arranged to define the path of the end of the inclined axis of said globe, said band being scaled to correspond to the division of time for the year, whereby said globe may be adjusted to demonstrate the inclination of the earth's axis at any selected time during the year.

3. The combination with a globe mounted for rotation about a vertical axis and about an axis inclined at $23\frac{1}{2}°$ to said vertical axis, of a band arranged above said globe concentrically to said vertical axis and spaced $23\frac{1}{2}°$ therefrom, said band being scaled to indicate the days of the month whereby the movement of the globe about its vertical axis will cause the globe to assume the position of the earth on that day of the month adjacent to which the end of the inclined axis is positioned.

4. The combination with a globe mounted for rotation about both a vertical axis and an inclined axis, a band arranged above said globe concentrically to said vertical axis and an indicator supported adjacent to and adjustable over the face of the globe to indicate the movement of any part of the globe relatively to said band.

5. The combination with a globe mounted for rotation about both a vertical axis and an inclined axis, of a time band arranged circumferentially of said globe in the plane of its greatest horizontal diameter, a date band supported above said globe to define the path of movement of the end of said inclined axis, and a scale mounted for movement about said inclined axis, and arranged to intersect said time band.

6. The combination with a globe mounted for rotation about both a vertical axis and an inclined axis, of a time band arranged circumferentially of said globe in the plane of its greatest horizontal diameter, a date band supported above said globe to define the path of movement of the end of said inclined axis, a scale mounted for movement about said inclined axis, and arranged to intersect said time band, and an indicator movable longitudinally of said scale.

7. The combination with a globe mounted for rotation about both a vertical axis and an inclined axis, of a time band arranged circumferentially of said globe in the plane of its greatest horizontal diameter, a date band supported above said globe to define the path of movement of the end of said inclined axis, and a scale intersecting said time band and mounted on said globe for movement therewith, and capable of adjustment about said inclined axis.

8. The combination with a globe mounted for movement about a vertical and an inclined axis, of a time band arranged circumferentially of said globe in the plane of its greatest horizontal diameter and scaled to indicate the twenty-four hours of the day, and a daylight and darkness band arranged circumferentially of said globe in the plane of its greatest vertical diameter and intersecting said time band midway between the noon and midnight indications.

9. The combination with a globe mounted for movement about a vertical axis and an inclined axis, of a time band arranged circumferentially of said globe in the plane of its greatest horizontal diameter and scaled to indicate the twenty-four hours of the day, a daylight and darkness band arranged circumferentially of said globe in the plane of its greatest vertical diameter and intersecting said time band midway between the noon and midnight indications, and a scale adjustably mounted on said globe to coöperate with said time band and with said last-mentioned band.

10. The combination with a globe mounted for movement about a vertical axis and an inclined axis, of a time band arranged circumferentially of said globe in the plane of its greatest horizontal diameter and scaled to indicate the twenty-four hours of the day, a daylight and darkness band arranged circumferentially of said globe in the plane of its greatest vertical diameter, and intersecting said time band midway between the noon and midnight indications, a scale adjustably mounted on said globe to coöperate with said time band and with said last-mentioned band, and a semi-circular scale pivotally mounted at its ends on the inclined axis of said globe, normally movable with said globe, and capable of adjustment relatively to said globe.

11. The combination with a globe mounted for movement about a vertical axis and an inclined axis, of a time band arranged circumferentially of said globe in the plane of its greatest horizontal diameter and scaled to indicate the twenty-four hours of the day, a daylight and darkness band arranged circumferentially of said globe, in the plane of its greatest vertical diameter, and intersecting said time band midway between the noon and midnight indications, a scale adjustably mounted on said globe to coöperate with said time band and with said last-mentioned band, a semi-circular scale pivotally mounted at its ends on the inclined axis of said globe, normally movably with said globe and capable of adjustment relatively to said globe, and an indicator slidably mounted on said semi-circular scale.

12. The combination with a globe mounted for movement about a vertical axis and an inclined axis, of a time band arranged circumferentially of said globe in the plane of its greatest horizontal diameter and scaled to indicate the twenty-four hours of the day, a daylight and darkness band arranged circumferentially of said globe, in the plane of its greatest vertical diameter, and intersecting said time band midway between the noon and midnight indications, a scale adjustably mounted on said globe to coöperate with said time band and with said last-mentioned band, a scale mounted at its ends on the inclined axis of said globe and capable of movement with said globe and movement relatively thereto, said scale being marked to indicate the degrees of latitude.

13. The combination with a base, a globe mounted on said base for movement about both a vertical axis and an inclined axis, and a separable connection between said globe and said base, of arms extending upwardly from said base, a horizontal band carried by said arms and arranged circumferentially of said globe, a semi-circular band secured to said horizontal band, extending above said globe in circular alinement with the ends of said arms, and means for detachably connecting said horizontal band to said arms.

In testimony whereof, I affix my signature in presence of two witnesses.

MERRILL W. HARD.

Witnesses:
F. W. SCHAEFER,
R. M. MILLER.

Copies of this patent may be obtained for five cents each, by addressing the "Commissioner of Patents, Washington, D. C."